United States Patent
Kern et al.

(10) Patent No.: US 10,755,842 B2
(45) Date of Patent: Aug. 25, 2020

(54) METHOD FOR PRODUCING AN ELECTRIC STRIP LAMINATE WOUND AS A COIL

(71) Applicant: VOESTALPINE STAHL GMBH, Linz (AT)

(72) Inventors: Carina Kern, Linz (AT); Ronald Fluch, Linz (AT)

(73) Assignee: voestalpine Stahl GmbH, Linz (AT)

( * ) Notice: Subject to any disclaimer, the term of this patent is extended or adjusted under 35 U.S.C. 154(b) by 383 days.

(21) Appl. No.: 15/539,675

(22) PCT Filed: Sep. 4, 2015

(86) PCT No.: PCT/AT2015/050215
§ 371 (c)(1),
(2) Date: Jun. 24, 2017

(87) PCT Pub. No.: WO2016/033630
PCT Pub. Date: Mar. 10, 2016

(65) Prior Publication Data
US 2018/0082773 A1   Mar. 22, 2018

(30) Foreign Application Priority Data
Sep. 5, 2014   (AT) .............................. A50615/2014

(51) Int. Cl.
*H01F 7/06*   (2006.01)
*H01F 1/18*   (2006.01)
(Continued)

(52) U.S. Cl.
CPC ................. *H01F 1/18* (2013.01); *B32B 7/12* (2013.01); *B32B 15/043* (2013.01); *B32B 15/08* (2013.01);
(Continued)

(58) Field of Classification Search
CPC ....... B32B 7/12; B32B 15/043; B32B 15/088; B32B 15/098; B32B 15/18; B32B 27/08;
(Continued)

(56) References Cited

U.S. PATENT DOCUMENTS 3,749,398 A * 7/1973 Fujita ..................... B65H 29/36
271/180
4,277,530 A * 7/1981 Miller ....................... H01F 1/18
428/216

(Continued)

FOREIGN PATENT DOCUMENTS

DE   3033378 A1   3/1981
DE   4331787 A1   4/1994
(Continued)

*Primary Examiner* — Paul D Kim

(57) ABSTRACT

A method for producing an electric strip laminate wound into a coil is disclosed, in which at least two metallic electric strips that are electrically insulated from each other are integrally bonded to form an electric strip laminate and in another step, are wound into a coil. In order to ensure a reproducible method, the invention proposes that the electrical strips, which are each electrically insulated on at least one flat side with a baked enamel layer, be joined to each other by means of baked enamel layers facing each other and be integrally bonded to form an electric strip laminate by activating the chemical cross-linking of the two baked enamel layers.

16 Claims, 2 Drawing Sheets

(51) Int. Cl.
- B32B 15/04 (2006.01)
- B32B 15/18 (2006.01)
- B32B 15/08 (2006.01)
- B32B 27/42 (2006.01)
- H01B 3/40 (2006.01)
- B32B 27/08 (2006.01)
- B32B 27/38 (2006.01)
- B32B 15/088 (2006.01)
- B32B 27/34 (2006.01)
- B32B 27/30 (2006.01)
- C21D 9/46 (2006.01)
- B32B 7/12 (2006.01)
- B32B 37/12 (2006.01)
- B32B 38/00 (2006.01)
- H01F 27/32 (2006.01)
- H01F 41/02 (2006.01)
- B32B 15/098 (2006.01)
- H01B 3/30 (2006.01)
- C21D 8/12 (2006.01)

(52) U.S. Cl.
CPC ............ B32B 15/088 (2013.01); B32B 15/18 (2013.01); B32B 27/08 (2013.01); B32B 27/306 (2013.01); B32B 27/34 (2013.01); B32B 27/38 (2013.01); B32B 27/42 (2013.01); B32B 37/1207 (2013.01); B32B 38/0012 (2013.01); C21D 9/46 (2013.01); H01B 3/40 (2013.01); H01F 27/32 (2013.01); H01F 41/0213 (2013.01); *B32B 15/098* (2013.01); *B32B 2255/06* (2013.01); *B32B 2255/26* (2013.01); *B32B 2307/202* (2013.01); *B32B 2307/206* (2013.01); *B32B 2307/50* (2013.01); *B32B 2457/00* (2013.01); *C21D 8/1283* (2013.01); *C21D 2251/02* (2013.01); *C21D 2251/04* (2013.01); *H01B 3/30* (2013.01)

(58) Field of Classification Search
CPC ....... B32B 27/306; B32B 27/34; B32B 27/38; B32B 27/42; B32B 37/1207; B32B 38/0012; C21D 8/1283; C21D 9/46; H01B 3/30; H01B 3/40; H01F 1/18; H01F 27/32; H01F 41/0213
See application file for complete search history.

(56) References Cited

U.S. PATENT DOCUMENTS

| | | | | |
|---|---|---|---|---|
| 4,336,302 | A * | 6/1982 | Ihlein | C08G 59/68 428/324 |
| 5,018,267 | A * | 5/1991 | Schoen | B32B 37/0038 156/295 |
| 5,037,706 | A * | 8/1991 | Lin | B32B 3/10 428/593 |
| 5,558,735 | A | 9/1996 | Rettew et al. | |
| 6,680,120 | B1 * | 1/2004 | Nagel | C08K 5/29 174/110 N |
| 6,789,311 | B2 * | 9/2004 | Fidi | H01F 27/323 29/605 |
| 2004/0247927 | A1 * | 12/2004 | Kurz | B23K 11/002 428/608 |
| 2016/0314870 | A1 * | 10/2016 | Nonaka | H01B 3/46 |

FOREIGN PATENT DOCUMENTS

| DE | 69611009 T2 | 6/2001 |
|---|---|---|
| JP | S63249624 A | 10/1988 |
| WO | 2007116047 A1 | 10/2007 |

* cited by examiner

METHOD FOR PRODUCING AN ELECTRIC STRIP LAMINATE WOUND AS A COIL

FIELD OF THE INVENTION

The invention relates to a coil and method for producing an electric strip laminate wound into a coil in which at least two metallic electric strips that are electrically insulated from each other are integrally bonded to thrill an electric strip laminate and in another step, are wound into a coil.

BACKGROUND OF THE INVENTION

The prior art has disclosed coils composed of an electric strip that is coated with baked enamel. These coils are cut into pieces to produce, among other things, baked enamel-coated sheet metal parts for laminated cores, for example for electric machines. In this connection, the production time of such laminated cores is determined to a not insignificant degree by the cutting of the individual sheet metal parts.

In order to minimize the time expenditure, DE3033378A1 proposes a coil made of a multilayered electric strip laminate. This electric strip laminate is produced, for example, by gluing two electric strips, which are electrically insulated from each other by means of a coating. What is proposed is to select the coating from a group that includes phosphate glass, magnesium silicate, and phosphate glass over magnesium silicate. In order to integrally bond these coated electric strips, an adhesive is used, which can, for example, be a phenolic adhesive, an epoxy adhesive, or a synthetic resin-based adhesive. As explained in greater detail by DE3033378A1, this adhesive must provide a sufficiently strong integral bond between the coatings of the electric strip in order to permit error-free processing of the electric strip laminate, for example when it is wound into a coil. To be specific, flaws in the joint can result in damage to the laminate when it is processed and due to short circuits that occur between the electric sheets, can result in an impaired magnetic or electromagnetic property of the electric strip laminate. It is therefore necessary to ensure that an increased level of care is taken, which thus complicates the production process and poses an obstacle to achieving a comparatively high reproducibility.

SUMMARY OF THE INVENTION

Consequently, the stated object of the invention is to simplify a method for producing a coil out of an electric strip laminate and to thus ensure a high degree of reproducibility. In addition, the coil should be highly stable.

The invention attains the stated object with regard to the method in that the electrically insulated electric strips that are each provided with a baked enamel layer on at least one flat side are joined to each other by means of baked enamel layers that face each other and are integrally joined to each other by activating the chemical cross-linking of the two baked enamel layers to each other to form an electric strip laminate.

If the electrically insulated electric strips that are each provided with a baked enamel layer on at least one flat side are joined to each other by means of baked enamel layers that face each other, then it is first possible to achieve an increased short-circuit-proofness since the flat sides that face each other each have a respective electrically insulating layer before they are joined. By contrast with the prior art, these two coatings also make it possible to eliminate the use of an additional adhesive for integrally joining the electric strips because the electric strips are integrally joined by activating the chemical cross-linking of the two baked enamel layers to each other to form an electric strip laminate. Because it is no longer necessary to apply additional adhesive to the joining region between the electrically insulating coatings, it is possible to reduce the risk of joining errors. In addition, a chemical cross-linking of the two baked enamel layers can ensure a particularly uniform integral bond between the electric strips—which then in turn particularly benefits non-damaging winding of the electric strip laminate into a coil. The further use of such an electric strip laminate can thus occur with a lower risk of short-circuiting, thus no longer necessitating the expectation of a degraded electromagnetic property in the wound electric strip laminate. The integral bonding according to the invention of two baked enamel-coated electric strips to form an electric strip laminate—without having to additionally used adhesive for this purpose—therefore makes it possible to ensure a particularly simple, inexpensive method with a comparatively high reproducibility.

In general, it has been determined that a "coil" can be understood to be a metal strip that has been wound or coiled into a coil, which, as a semi-finished product, can be unwound or uncoiled for further processing.

In general, it can turn out to be valuable to use thermoplastic and/or thermosetting baked enamels. Baked enamels based on polyvinyl butyral, polyimide, or epoxy resin are likewise generally conceivable. The term "electric strip" can among other things be understood to mean an electrical steel strip or also a silicon steel strip, etc.

The integral bonding of the two baked enamel layers can be accelerated if on at least one baked enamel layer, a catalyst, in particular an amine, is applied. In this connection, a spray application of the catalyst has in particular turned out to be valuable, among other things since this can be performed in a particularly uniform way.

To this end, in particular 1-methylimidazole, 2-methylimidazole, and/or 1,2-diaminocyclohexane can excel as an amine.

If the baked enamel layers are thermally activated for their chemical cross-linking, then the operation of the method can be further simplified.

If coated electric strips are joined together to form an electric strip laminate, at least one electric strip of which is electrically insulated with a baked enamel layer on both of its flat sides, then it can turn out to be advantageous with regard to the further machining of the electric strip laminate if the activation temperature for chemically cross-linking the baked enamel layers on the flat sides facing each other is below the activation temperature of the baked enamel layer provided on the flat side facing away. It is thus possible, among other things, to ensure that the electric strip laminate that has been wound into a coil can be unwound without damage and undergo further processing.

If coated electric strips are combined to form an electric strip laminate, at least one electric strip of which has a cross-linked polymer electrical insulation layer on the flat side opposite from the flat side that is coated with baked enamel, then it can likewise turn out to be advantageous with regard to the further machining of the electric strip laminate if the activation temperature for chemically cross-linking the baked enamel layers on the flat sides facing each other is below the softening temperature of the polymer electrical insulation layer.

Further improvements in the formation of a stable integral bond can be achieved if the electric strips are pressed together while their integral bond is being produced. This can be conducive to a more uniform chemical cross-linking of the two baked enamel layers. The pressing together can preferably be carried out in a simple way from a process standpoint by means of at least one roller pair composed of opposing rollers in order to ensure a continuous process. In this connection, it can also be advantageous if the electric strips are pressed together with their flush flat sides. In general, it should be noted that a plurality of roller pairs, particularly with different rolling gaps, can improve the uniformity of the integral bond between the baked enamel layers.

The parameters of the integral bond can be further improved if the rollers of at least roller pair have a roller camber.

If the rollers of one roller pair have a concave roller camber and the rollers of another roller pair have a convex roller camber, then this can further improve the integral bonding of the electric strips. Preferably, these roller pairs can come one after the other each other in the series of roller pairs.

The electric short-circuit-proofness of the electric strip laminate can be increased if at least one of the baked enamel layers facing each other has an incompressible and in particular abrasive-free filler. Among other things, this can ensure the ability to wind the electric strip laminate into a coil without damaging it. This filler can also increase the short-circuit-proofness between the electric strips during the stamping of the electric strip laminate. To this end, the filler preferably contains the filler barium sulfate and/or lithopone.

The method according to the invention can particularly excel if it is used to produce a coil with an electric strip laminate. This can result in a particularly stable coil with an electric strip laminate, having an integral, chemically cross-linked bond between at least two electric strips. It is particularly advantageous for a coil to be produced with an electric strip laminate having an integral, chemically cross-linked bond composed of at least one baked enamel layer between at least two electric strips.

The magnetic short-circuit resistance of the coil or of its electric strip laminate can be increased if the integral bond contains an incompressible and in particular abrasive-free filler.

The above can be further increased by integrally bonding a plurality of baked enamel layers that are chemically cross-linked to one another although in general, a single chemically cross-linked baked enamel layer between two electric strip laminates can easily be sufficient to produce such an integral bond.

Preferably, at least one electric strip laminate, on the flat side facing away from the flat side with the integral bond, has either a baked enamel layer, whose activation temperature is above the activation temperature for the chemical cross-linking of the integral bond, or has a cross-linked polymer electrical insulation layer, whose softening temperature is above the activation temperature for the chemical cross-linking of the integral bond.

The above-described coil can be particularly suitable for cases in which several laminate parts for a magnetically conductive component are stamped out of its electric strip laminate.

BRIEF DESCRIPTION OF THE DRAWINGS

The subject of the invention is shown by way of example in the figures based on one embodiment variant. In the drawings.

DETAILED DESCRIPTION OF THE PREFERRED EMBODIMENTS

Figure 1:
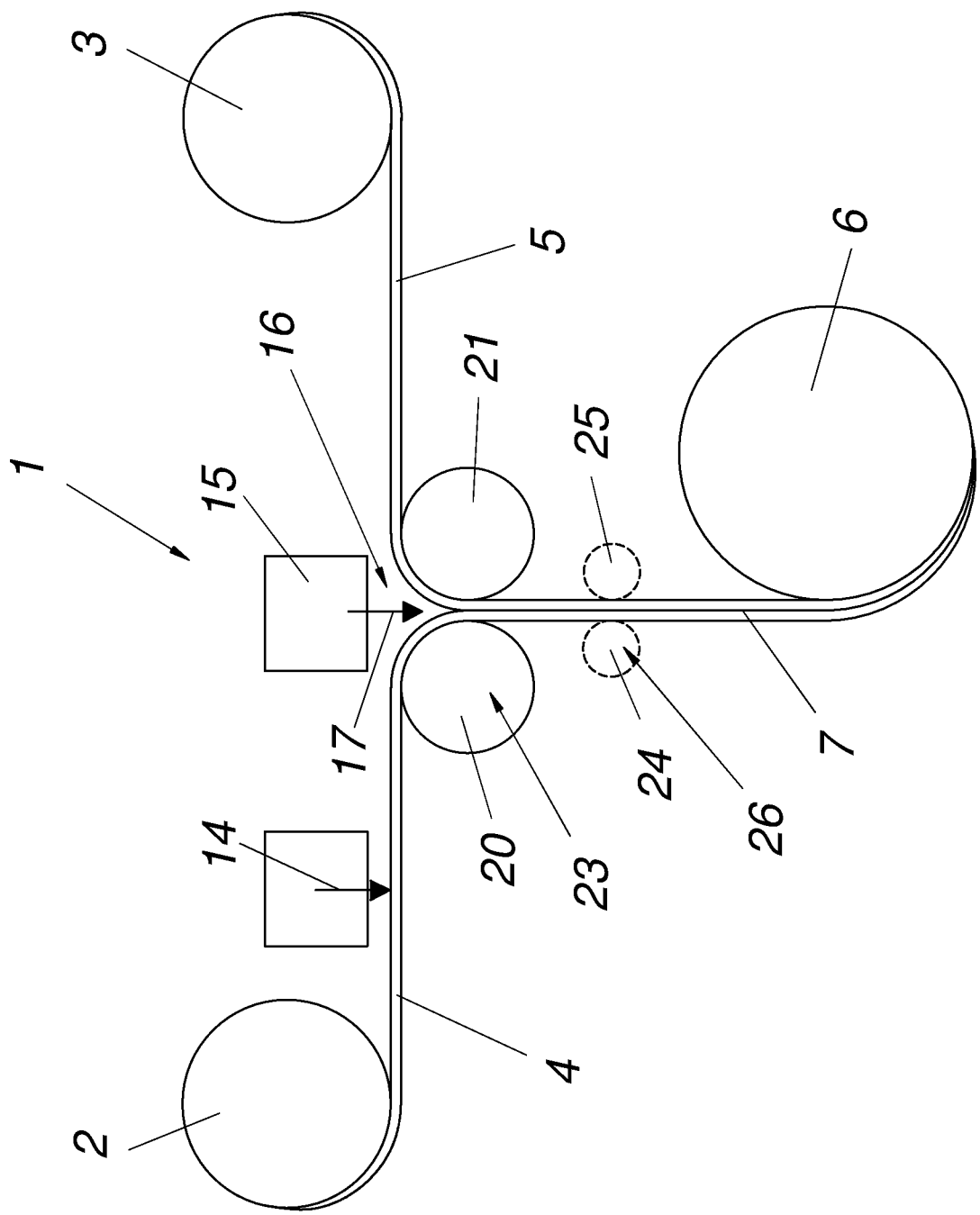
FIG. 1 is a schematic view of an apparatus for producing an electric strip laminate that is wound into a coil and FIG. 2 is an enlarged detail view from FIG. 1.

From the apparatus 1 schematically depicted in FIG. 1, it is clear that two coils 2, 3, which are each composed of a coated electric strip 4, 5—in the exemplary embodiment—are unwound and combined to form a coil 6. The bonding of the coated electric strips 4, 5 is carried out in an integral fashion, which produces an electric strip laminate 7. In addition, the bonded electric strips 4, 5 are electrically insulated from each other—namely by having a coating 8 that is shown in greater detail in FIG. 2. In order to prevent damage to the electric strip laminate 7 during winding, for example due to an insufficiently integral bonding process, the electrically insulated electric strips 4, 5 that are each provided with a baked enamel layer 11, 12 on at least one flat side 9, 10 are joined to each other by means of baked enamel layers 11, 12 that face each other and are bonded to each other by activating the chemical cross-linking of the two baked enamel layers 11, 12 to produce an electric strip laminate 7.

Figure 2:
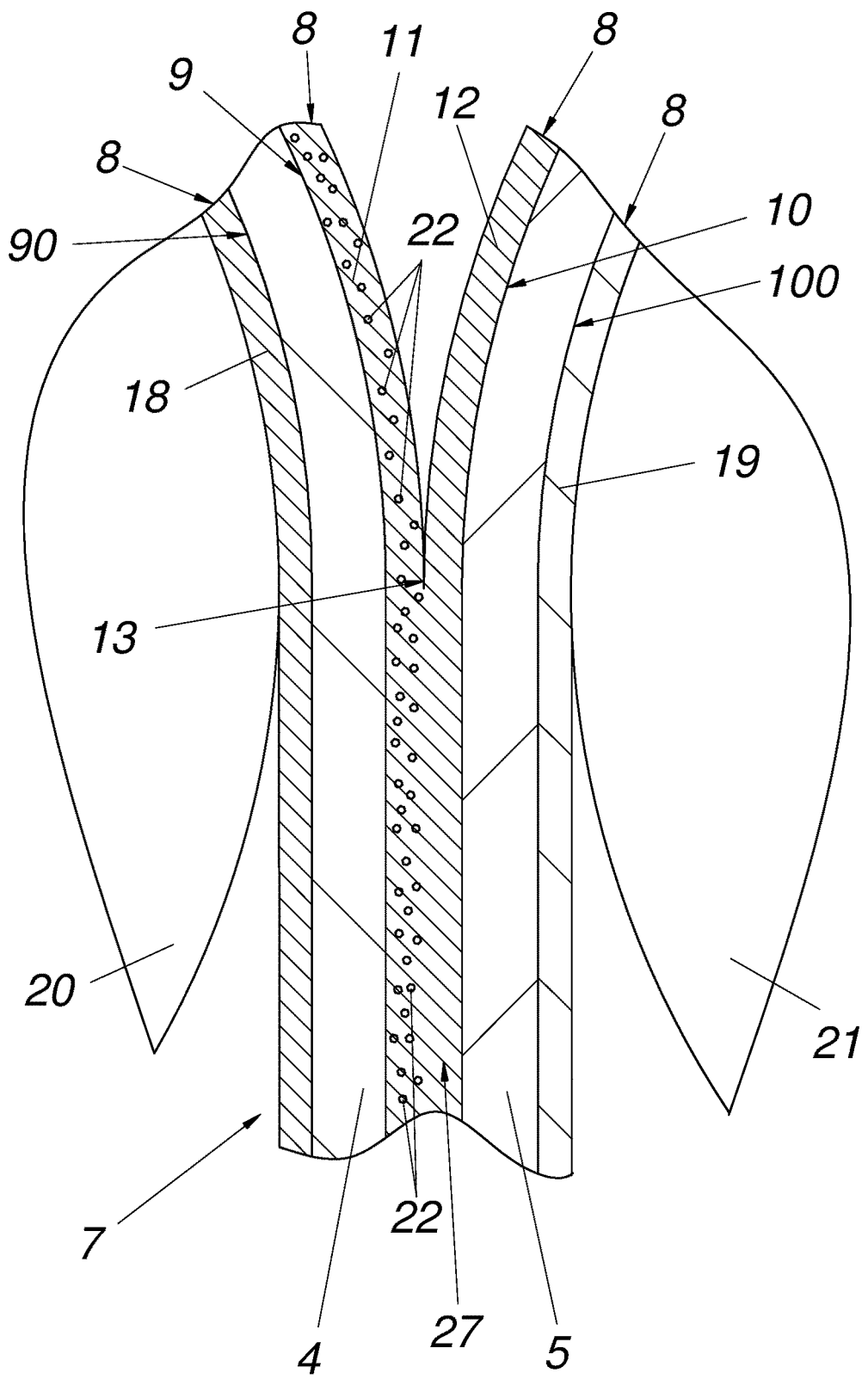

As is particularly apparent in FIG. 2, this does not require any additional adhesive between the two baked enamel layers 11, 12. The two baked enamel layers 11, 12 are brought into contact with each other and bond to each other to produce a stable electric insulation between the two electric strips 4 and 5. This ensures a comparatively high short-circuit-proofness of the electric strip laminate 7—even if the electric strip laminate 7 is significantly deformed, shaped, or cut in its further processing. In addition, the chemical cross-linking of the two baked enamel layers 11, 12 offers advantages with regard to the joining region 13—particularly with regard to uniform consistency, high mechanical strength, etc. Among other things, this makes it easier to wind the electric strip 7 into a coil 6.

This chemical cross-linking of the two baked enamel layers 11, 12, as indicated in FIG. 1, is accelerated by spray-applying an amine 14 as a catalyst. It has turned out to be advantageous to use 1-methylimidazole for this purpose—but it is also possible to use 2-methylimidazole and/or 1,2-diaminocyclohexane.

As is also apparent from FIG. 1, in order to produce their chemical cross-linking, the baked enamel layers 11, 12 are thermally activated by being irradiated with infrared 17 from a heat source 15 in the vicinity of the inflow 16 of the coated electric sheets 4, 5.

As shown in FIG. 2, both flat sides 9, 90 and 10, 100 of the respective electric strips 4, 5 are coated. In this connection, any coating 8 is conceivable; in particular, this coating should fulfill an electrically insulating function. For example, these coatings 8 of the flat sides 90, 100 could likewise constitute a baked enamel layer 18 and/or a cross-linked polymer electrical insulation layer 19.

If a baked enamel layer 18 is used as an electrically insulating coating of the electric strip 4, then during the joining of the baked enamel layers 11, 12 on the flat sides 9, 10 that face each other, an activation temperature for chemically cross-linking the baked enamel layers 11, 12 that are to be bonded is set to below the activation temperature of the baked enamel layer 18 provided on the flat side 90 facing away from it—or a baked enamel for the flat side 90 is selected, which has a correspondingly higher activation temperature. In a simple and effective way, this prevents the electric strip laminate 7 from sticking in the wound state.

In the case of an external coating of the electric strips 4, 5 with a cross-linked polymer electrical insulation layer 19, the activation temperature for chemically cross-linking the baked enamel layers 11, 12 on the flat sides 9, 10 facing each other is set to below the softening temperature of the polymer electrical insulation layer 19. This also prevents the electric strip laminate 7 from sticking in the wound state.

It is naturally still possible for the coatings 8 on the flat sides 90, 100 of the electric strips 4, 5 facing away from each other during the integral joining to be composed of the same material, but this has not been shown in detail in the drawings.

As the two electric strips 4, 5 are being integrally joined, they are pressed together with their flush flat sides 9, 10—in fact with the aid of opposing rollers 20, 21 and 24, 25, which form roller pairs 23, 24 situated one after the other. This gives the electric strip laminate 7 a relatively high mechanical resilience.

The rollers 20, 21 have a concave roller camber that is not shown in detail and the rollers 24, 25 have a convex roller camber, which improves the stability of the integral bond 27 between the electric, strips 4, 5—particularly if these two roller pairs come one after the other. It is also conceivable, however, to use other roller cambers or rollers that are free of a roller camber.

The tendency of the electric strips 4, 5 to short-circuit in a subsequent further use, which tendency is in particular caused by stamping, is reduced in this exemplary embodiment by means of barium sulfate as a non-compressible filler 22 in the baked enamel layer 11—as can be inferred from FIG. 2.

In general, in another embodiment that is not shown, it is conceivable for three or more electric strips to be bonded to one another in one processing step. This can also be advantageous for producing desired material combinations such as two hard covering layers and a more ductile intermediate layer in the electric strip laminate.

The invention claimed is:

1. A method for producing an electric strip laminate wound into a coil, the method comprising:
   electrically insulating at least two metallic electric strips from each other with a baked enamel layer on at least one flat side of each of the at least two metallic electric strips;
   joining the at least two metallic electric strips to each other with the baked enamel layers facing each other and with at least one of the at least two metallic electric strips electrically insulated with the baked enamel layer on both flat sides of the at least one of the metallic electric strips;
   thermally activating a chemical cross-linking of at least two baked enamel layers to integrally bond the at least two metallic electric strips to form the electric strip laminate, wherein an activation temperature for chemically cross-linking the baked enamel layers on the flat sides facing each other is below an activation temperature of the baked enamel layer provided on a flat side facing away; and
   winding the electric strip laminate into the coil.

2. The method according to claim 1, further comprising applying a catalyst onto at least one baked enamel layer.

3. The method according to claim 2, wherein the catalyst is an amine.

4. The method according to claim 3, comprising using at least one of the group consisting of 1-methylimidazole, 2-methylimidazole, and 1,2-diaminocyclohexane as the amine.

5. The method according to claim 1, further comprising pressing the at least two metallic electric strips together during the integral bonding of the at least two metallic electric strips, with at least one roller pair composed of opposing rollers.

6. The method according to claim 5, wherein the opposing rollers of the at least one roller pair have a roller camber.

7. The method according to claim 6, wherein the opposing rollers of one roller pair have a concave roller camber and the opposing rollers of another one of the at least one roller pair have a convex roller camber and these roller pairs come one after the other in a series of roller pairs.

8. The method according to claim 1, wherein at least one of the baked enamel layers facing each other has an incompressible and abrasive-free filler containing barium sulfate and/or lithopone.

9. A method for producing an electric strip laminate wound into a coil, the method comprising:
   electrically insulating at least two metallic electric strips from each other with a baked enamel layer on at least one flat side of each of the at least two metallic strips;
   joining the at least two metallic electric strips to each other with the baked enamel layers facing each other and with at least one of the at least two metallic electric strips having a cross-linked polymer electrical insulation layer on a flat side opposite from the flat side that is coated with the baked enamel;
   thermally activating a chemical cross-linking of at least two baked enamel layers to integrally bond the at least two metallic electric strips to form the electric strip laminate, wherein an activation temperature for chemically cross-linking the baked enamel layers on the flat sides facing each other is below a softening temperature of the cross-linking polymer electrical insulation layer; and
   winding the electric strip laminate into the coil.

10. The method according to claim 9, further comprising applying a catalyst onto at least one baked enamel layer.

11. The method according to claim 10, wherein the catalyst is an amine.

12. The method according to claim 11, comprising using at least one of the group consisting of 1-methylimidazole, 2-methylimidazole, and 1,2-diaminocyclohexane as the amine.

13. The method according to claim 9, further comprising pressing the at least two metallic electric strips together during the integral bonding of the at least two metallic electric strips, with at least one roller pair composed of opposing rollers.

14. The method according to claim 13, wherein the opposing rollers of the at least one roller pair have a roller camber.

15. The method according to claim 14, wherein the opposing rollers of one roller pair have a concave roller camber and the opposing rollers of another one of the at least one roller pair have a convex roller camber and these roller pairs come one after the other in a series of roller pairs.

16. The method according to claim 9, wherein at least one of the baked enamel layers facing each other has an incompressible and abrasive-free filler containing barium sulfate and/or lithopone.

* * * * *